O. D. ESHELMAN AND W. F. BOAST.
SAW.
APPLICATION FILED JAN. 17, 1921. RENEWED JUNE 9, 1922.
1,423,843.
Patented July 25, 1922.
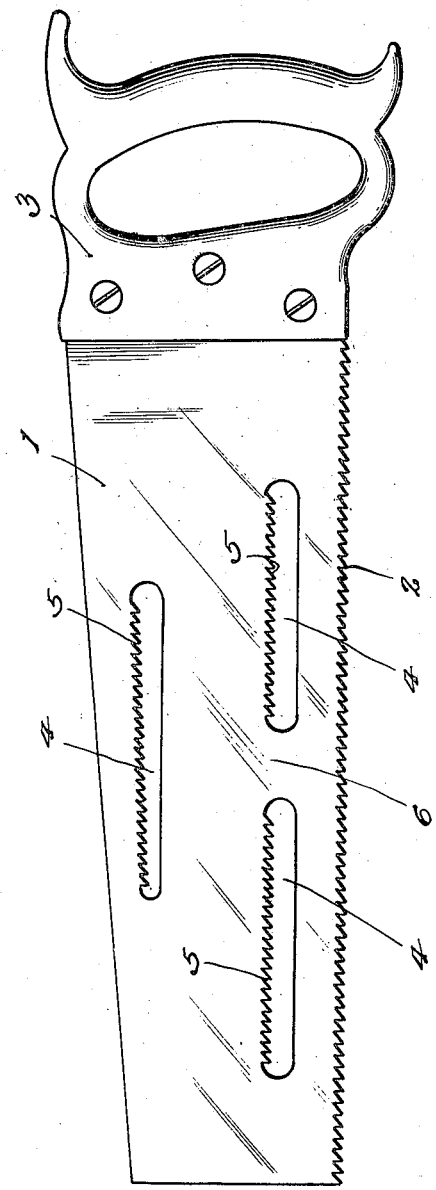
Inventors
Oliver D. Eshelman,
William F. Boast.
By Lacey & Lacey, Attorneys

UNITED STATES PATENT OFFICE.

OLIVER D. ESHELMAN AND WILLIAM F. BOAST, OF CASPER, WYOMING.

SAW.

1,423,843.   Specification of Letters Patent.   Patented July 25, 1922.

Application filed January 17, 1921, Serial No. 437,803. Renewed June 9, 1922. Serial No. 567,192.

*To all whom it may concern:*

Be it known that we, OLIVER D. ESHELMAN and WILLIAM F. BOAST, citizens of the United States, residing at Casper, in the county of Natrona and State of Wyoming, have invented certain new and useful Improvements in Saws, of which the following is a specification.

This invention is a novel construction of saw blade. In sawing through lumber of any appreciable thickness, unless the lumber has been thoroughly cured, there is a tendency of the lumber to swell as the sawing operation progresses and cause the sides of the kerf or groove to bind against the faces of the saw blade and make it difficult for the workman to move the saw. The object of our invention is to provide a saw blade of such construction that as it progresses through the lumber the opposed walls of the kerf will be cleared so that the pinching or binding of the blade now frequently encountered will be overcome. This object we attain in such a device as is illustrated in the accompanying drawing which shows an elevation of a saw constructed in accordance with our invention.

The blade 1 may be of any desired form and dimensions and is provided with the usual cutting teeth 2 along its lower edge. The usual handle 3 is secured to one end of the blade, as shown. Saw blades now generally constructed are solid throughout their extent but in carrying out our invention, we form in the blade longitudinal slots 4 which are of less extent than the blade and are provided upon their upper edges with supplemental saw teeth 5. A single slot may be efficient in small saws which are used on comparatively thin lumber but with larger saws intended to cut through heavy thick lumber we provide a plurality of slots which are spaced apart so as to leave a portion 6 of the web of the blade between the slots to serve as a brace and prevent buckling of the blade. The slots may be in alinement, as shown in the lower portion of the drawing, and above the alined slots an upper slot may be provided in staggered relation to the lower slots, as clearly shown. The particular arrangement of the slots, however, may be varied at will but in order to obtain the best results and prevent buckling of the blade it is desirable to leave portions of the blade uninterrupted to serve as a connecting brace between the slots, as will be readily understood.

It will be readily understood that as the sawing operation progresses with our improved saw the supplemental teeth 5 will be caused to follow the main cutting teeth 2 and as the lumber swells and causes the opposed walls of the kerf to pinch and bind upon the sides of the saw blade the supplemental teeth will cut through the pinching or binding portions of said walls so that clearance will be provided for the blade and the sawing operation may proceed expeditiously and uninterruptedly. The invention does not add materially to the cost of the saw and does not interfere in any way with the ordinary use of the saw nor with the packing of a number of the saws in the usual manner to economize space in transportation.

Having thus described the invention, what is claimed as new is:

1. A saw blade provided with a plurality of slots disposed in staggered relation with respect to each other and each provided along one edge with teeth pointing in the same direction as the normal cutting teeth and their cutting edges running parallel with that of the normal cutting teeth.

2. A saw blade provided with a plurality of slots disposed in staggered lapped relation with respect to each other and each provided along one edge with teeth running substantially in the length direction of the blade.

In testimony whereof we affix our signatures.

OLIVER D. ESHELMAN. [L. S.]
WILLIAM F. BOAST. [L. S.]